United States Patent Office 3,461,739
Patented Aug. 19, 1969

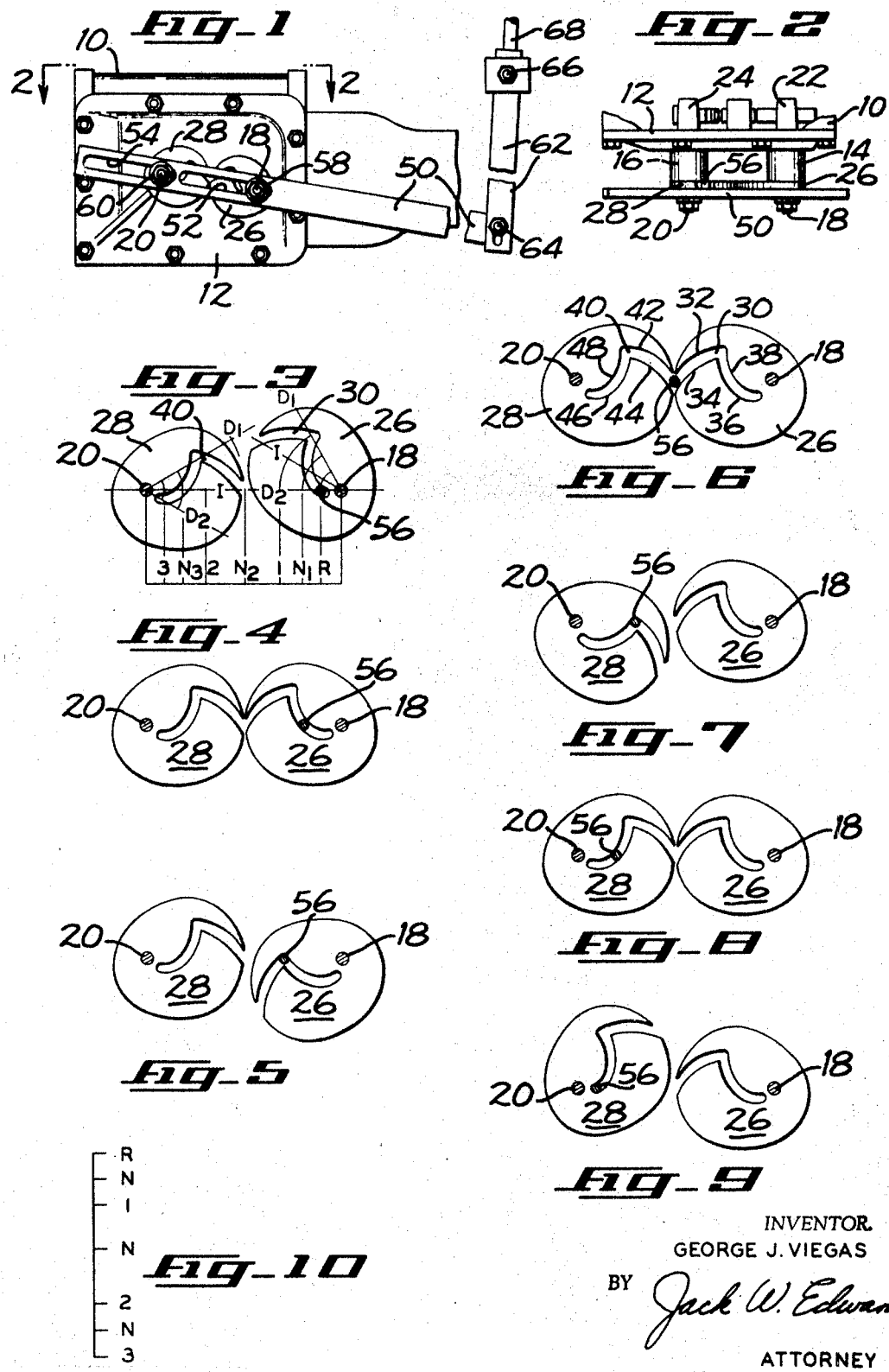

3,461,739
GEAR SHIFT MECHANISM
George J. Viegas, 14336 New Jersey Ave.,
San Jose, Calif. 95124
Filed Apr. 25, 1967, Ser. No. 633,599
Int. Cl. G05g 9/06, 9/18
U.S. Cl. 74—473
4 Claims

ABSTRACT OF THE DISCLOSURE

A mechanism for shifting gears in a standard automotive transmission with a pair of control shafts extending therefrom, including a pair of actuating members fixed to the shafts, each actuating member having a slot for receiving a pin, the pin being adapted to travel in a linear path to pivot the actuating members and shafts enabling a shift pattern in the form of a uniform line.

Background of the invention

*Field of the invention.*—Control lever and linkage systems for multiple controlled elements in a standard automotive transmission enabling the changing of gears by following a shift pattern which is a uniform line.

*Description of the prior art.*—The standard type transmission used on American-made automobiles customarily follows a shift pattern in the form of the letter H. Regardless of whether the gear shift lever is mounted on the floor of the vehicle or on the side of the steering column, this same shift pattern is used. Such a shift pattern is undesirable for use in racing cars because of the delay incurred in the process of shifting from first gear to second gear and between second and third gears. Furthermore, there is a danger of transmission damage when shifting gears under racing conditions if a mistake is made in gear selection. Various shift linkages have been developed which modify the standard H-type shift pattern. One linkage provides a shift pattern in the form of a wye with the stem and one branch being in a straight line. Another linkage provides a shift pattern in the form of a H on one side, which is made in a vertical plane but allows the shifting to be in a straight line therein. While such patterns are some improvement, they still require a certain amount of effort for execution and present a hazard in the event of improper gear selection.

Brief summary of the invention

This gear shift mechanism enables the progressive changing of gears in an automotive transmission operated by two control shafts with a shift pattern in the form of a uniform line. The mechanism includes an actuating member having a slot therein fixed to each control shaft and a guide pin adapted to travel within the slots of each actuating member as to apply force thereto, causing the respective control shaft to pivot to the desired gear drive or neutral setting.

An object of the present invention is to enable the progressive shifting of gears by continuous movement of a shift handle along a uniform line. This provides for easy shifting in a rapid manner which eliminates the hazard of improper gear selection. Other objects and advantages of the invention will be apparent from the following detailed description.

Brief description of the drawing

FIGURE 1 is a side elevation view of a standard type transmission housing with a gear shift mechanism mounted thereon embodying the present invention.

FIGURE 2 is a partial plan view of the gear shift mechanism taken on line 2—2 of FIG. 1 and having portions broken away to show underlying structure.

FIGURE 3 is an enlarged side view of the actuating members when the guide pin is in a reverse gear setting.

FIGURE 4 is a similar view with the guide pin in a first neutral setting from reverse gear.

FIGURE 5 is a similar view with the guide pin in a first gear setting.

FIGURE 6 is a similar view with the guide pin in an intermediate neutral setting.

FIGURE 7 is a similar view with the guide pin in a second gear setting.

FIGURE 8 is a similar view with the guide pin in a third neutral setting.

FIGURE 9 is a similar view with the guide pin in a third gear setting.

FIGURE 10 is a diagrammatic view of the gear shift pattern.

Description of the preferred embodiment

A standard automotive transmission is shown in FIG. 1 having a main housing 10 with a removable side plate 12. A pair of cylindrical bosses 14 and 16 (see FIG. 2) project outward from the side plate and are axially drilled to receive control shafts 18 and 20, respectively. Within the housing, link 22 is mounted on control shaft 18 while link 24 is mounted on control shaft 20 for changing gears therein. Central portions of the control shafts are journalled within the bosses and outer ends extend therefrom.

A first actuating member 26 is mounted on and keyed to the outer end of control shaft 18. Similarly, a second actuating member 28 is mounted and keyed on the outer end of control shaft 20. These actuating members are shown more clearly in FIGS. 3–9, and each actuating member has a slot extending inward from the outer periphery towards the control shaft on which it is mounted. With reference to FIG. 6, actuating member 26 has a slot 30 with a first portion defined between outer edge 32 and inner edge 34 while a second portion is defined between outer edge 36 and inner edge 38. Similarly, a slot 40 is provided within member 28 and includes a first portion defined by outer edge 42 and inner edge 44, while a second portion is defined by outer edge 46 and inner edge 48. Looking now at FIG. 3, it will be seen that the slots are laid out as segments of spiral curves with central angles equivalent to the angle of control shaft pivot between gear positions and radial variations that are proportional to the linear displacement of the shift handle between neutral and drive settings. Along the centerline of the first portion of slot 30 is a spiral curve having a central angle as defined between lines I and $D_1$. This angle is equal to the pivot angle of control shaft 18 as it moves between an intermediate position where line I coincides with the line between control shafts 18 and 20, to a first displaced position where line $D_1$ coincides with the line between control shafts. The change in radius along the spiral is equal to the linear displacement along the line between control shafts from the neutral gear setting $N_2$, located between first and second gears, to the first gear position. The second portion of slot 30 curves in the opposite direction from the first and has a central angle defined between lines $D_1$ and $D_2$. This angle equals the pivot angle of the control shaft between the first and second displaced positions on opposite sides of the intermediate position. The radius varies by an amount equal to the linear displacement between the first gear position and the reverse gear position.

Similarly, slot 40 in actuating member 28 has a first spiral portion with a central angle defined between lines I and $D_1$ and which is equal to the angle of pivot of control shaft 20 between an intermediate position and a first displaced position. The radius varies with the linear displacement between the intermediate neutral setting $N_2$ and the second gear position 2. The second portion of slot 40 curves in the opposite direction from the first and has a central angle defined between lines $D_1$ and $D_2$. This angle equals the pivot angle of the control shaft 20 between the opposite displaced positions. The radius varies by an amount equal to the linear displacement between the second gear position and the third gear position.

An arm 50 is positioned adjacent to the actuating members 26 and 28, with control shafts 18 and 20 fitting through longitudinal slots 52 and 54 of the arm. A guide pin 56, as shown in FIG. 2, projects inward from the arm and is adapted to fit and travel within the slots of the actuating members in a linear path as the arm is moved in a straight line between the two control shafts. The arm is held in place by a cap nut 58, fitted upon the end of control shaft 18, and a cap nut 60 fitted upon the end of control shaft 20. Lever 62 is connected to the arm by a bolt 64 and is pivotably mounted at the opposite end upon bolt 66. A shift handle 68 extends from the lever end adjacent bolt 66 for use by a driver when shifting gears of the automobile.

Shifting of gears follows the diagram shown in FIG. 10 so that when shift handle 68 is pushed forward, guide pin 56 moves to the position shown in FIG. 3, which is the most rearward position in slot 30. By pulling back on the shift handle, guide pin 56 moves forward to a neutral setting as shown in FIG. 4 and continuing through the neutral setting to the first gear position shown in FIG. 5. Actuating member 26 pivots with the movement of the guide pin from the reverse through neutral positions to the first gear setting as the guide pin bears against the outer edge 36. Continuing to move the shift handle rearward causes the pin to bear against outer edge 32 which pivots the actuating member 26 upwardly to the neutral position shown in FIG. 6. At this point, the guide pin is positioned between the actuating members and further movement causes the guide pin to bear against the inner edge 44 of actuating member 28, causing the actuating member to pivot downward to the second gear position as shown in FIG. 7. Further movement of the guide pin brings it to bear against inner edge 48, causing the actuating member to pivot in a counter direction through the neutral position shown in FIG. 8 to the third gear position shown in FIG. 9. Shifting down can be accomplished by the reverse procedure of pushing forward on the shift handle and causing the guide pin to move rearward. The guide pin bears against opposite edges of the slots 30 and 40 from which contact was made with when moving in a forward direction. It is not necessary to shift completely through the range of gears but only as far as desired to obtain the proper gear setting.

FIGS. 3–9 were taken on the line between control shafts 18 and 20, which is slightly inclined to the horizontal as illustrated in FIG. 1 but oriented to the horizontal for these diagrammatic views. The linear displacement between drive settings, as illustrated in FIG. 3, are substantially uniform except between the first and second gear positions and the intermediate neutral position $N_2$. This displacement was lengthened so as to flatten the slot angle between the first and second spiral curve portions.

While the gear shift mechanism disclosed shows the actuating members mounted directly on the control shafts, an apparent modification would be to mount the actuating members on a pair of pivot shafts spaced from the control shafts. The pivot shafts and control shafts would then be connected with suitable linkage for transmitting the motion from one shaft to the other.

I claim:
1. In an automotive transmission having two control shafts extending therefrom for placing the transmission in various drive settings in addition to a neutral setting, a gear shift mechanism comprising:
  a first actuating member mounted on one control shaft for pivotal movement therewith and having a slot extending inward from the outer periphery of the actuating member towards the control shaft on which it is mounted;
  a second actuating member mounted on the other control shaft for pivotal movement therewith and having a slot extending inward from the outer periphery of the actuating member towards the control shaft on which it is mounted;
  an arm positioned transversely of the control shafts, adjacent the actuating members, and adapted for longitudinal sliding movement in a linear path on the control shafts; and
  a guide pin projecting from the arm into the slots of said actuating members whereupon movement of the guide pin in a linear path within a slot causes the respective actuating member and control shaft to pivot for selecting a desired gear setting.

2. A gear shift mechanism as described in claim 1, wherein the slot at the outer periphery of the first actuating member is directly opposed to the slot at the outer periphery of the second actuating member when both control shafts are in a neutral setting.

3. A gear shift mechanism as described in claim 1, each control shaft of the automotive transmisson being pivotable from an intermediate position corresponding to said neutral setting to either of two oppositely displaced positions for placing the transmission in various drive settings, one control shaft being pivotable to shift the transmission into a reverse gear and a first-speed gear forward, the other control shaft being pivotable to shift the transmission into a second-speed gear forward and a third-speed gear forward; and wherein the slot of the first actuating member extends inward from the outer periphery thereof along a spiral curve having a central angle equal to the angle of pivot of the one control shaft from the intermediate position to one displaced position and a variation in radius equal to the linear displacement of the guide pin between an intermediate neutral position and the first-speed gear forward position, and the slot of the second actuating member extends inward from the outer periphery thereof along a spiral curve having a central angle equal to the angle of pivot of the other control shaft from the intermediate position to a first displaced position and a variation in radius equal to the linear displacement of the guide pin between an intermediate neutral position and the second-speed gear forward position.

4. A gear shift mechanism as described in claim 3, wherein the slot of the first actuating member extends inward from the spiral curve along a second spiral curve having a central angle equal to the degree of pivot of the one control shaft between the two oppositely displaced positions and a variation in radius equal to the linear displacement of the guide pin between the first-speed gear forward and the reverse gear position, and the slot of the second actuating member extends inward from the spiral curve therein along a second spiral curve having a central angle equal to the degree of pivot of the other control shaft between the two oppositely displaced positions and a variation in radius equal to the linear displacement of the guide pin between the second-speed gear forward position and the third-speed gear forward position.

References Cited

UNITED STATES PATENTS

| 2,494,222 | 1/1950 | Zwald | 74—473 |
|---|---|---|---|
| 3,122,941 | 3/1964 | Goldsmith | 74—473 |

MILTON KAUFMAN, Primary Examiner

U.S. Cl. X.R.

74—337.5